United States Patent [19]

Siol et al.

[11] Patent Number: 5,446,095
[45] Date of Patent: Aug. 29, 1995

[54] COMPATIBLE POLYMER BLENDS

[75] Inventors: Werner Siol, Darmstadt-Eberstadt; Erwin Felger, Darmstadt; Ulrich Terbrack, Reinheim, all of Germany

[73] Assignee: Rohm GmbH Chemische Fabrik, Darmstadt, Germany

[21] Appl. No.: 168,204

[22] Filed: Dec. 17, 1993

Related U.S. Application Data

[62] Division of Ser. No. 840,198, Feb. 24, 1992, Pat. No. 5,322,900.

[30] Foreign Application Priority Data

Feb. 23, 1991 [DE] Germany ............... 41 05 793.7

[51] Int. Cl.⁶ ............... C08L 25/06; C08L 25/08; C08L 33/10; C08L 53/02
[52] U.S. Cl. ............... 525/93; 525/228; 525/227; 525/216; 525/931
[58] Field of Search ............... 525/216, 227, 228, 93

[56] References Cited

U.S. PATENT DOCUMENTS

| | | |
|---|---|---|
| 4,889,894 | 12/1989 | Siol et al. |
| 4,892,909 | 1/1990 | Siol et al. |
| 4,897,441 | 1/1990 | Siol et al. |
| 4,898,912 | 2/1990 | Siol et al. ............... 525/199 |
| 4,952,455 | 8/1990 | Siol et al. |
| 4,985,504 | 1/1991 | Siol. |
| 5,053,276 | 10/1991 | Siol. |
| 5,109,072 | 4/1992 | Siol et al. ............... 525/28 |
| 5,322,900 | 6/1994 | Siol et al. |

Primary Examiner—Carman J. Seccuro, Jr.
Attorney, Agent, or Firm—Oblon, Spivak, McClelland, Maier & Neustadt

[57] ABSTRACT

Compatible polymer blends PM, exhibiting a single glass transition temperature Tg comprise (A) 0.1–99.9 wt. % of a polymer P1 comprising at least 95 wt. % styrene; and
(B) 99.9–0.1 wt % of a polymer P2 comprising
 (a) more than 90 wt. % and up to 100 wt. % of ethyl methacrylate, and
 (b) 0 wt. % up to less than 10 wt. % of at least one monomer copolymerizable with ethyl methacrylate, provided that (a) plus (b) add up to 100 wt. %.

The compatible polymer blends may be formulated with another polymer P3, chemically differentiable from P1 and P2, with P3 being incompatible with P1, P2 and PM, to form compositions of better impact resistance than PM. The compatible polymer blends find use in the production of weather-resistant items; data-storage discs, especially for optically readable information; and optical gradient fibers.

10 Claims, No Drawings

COMPATIBLE POLYMER BLENDS

This is a division of application Ser. No. 07/840,198, filed on Feb. 24, 1992, now U.S. Pat. No. 5,322,900.

BACKGROUND OF THE INVENTION

1. Field of the Invention

This invention relates to compatible polymer blends of styrene polymers and ethyl methacrylate polymers and composite systems thereof.

2. Description of the Prior Art

Polymer compatibility has been considered to be the exception to the rule since the beginning of pertinent studies, and incompatibility the rule. (Cf. Kirk-Othmer, Encyclopedia of Chemical Technology, 3rd Ed. Vol. 18, pg. 443–478 J. Wiley 1982). Prior studies of the compatibility of polystyrene appeared to confirm its general incompatibility with other polymers (Cf. R. J. Petersen et al., Polymer Preprints Am. Chem. Soc. Div. Polym. Chem. 10, 385 (1969)).

Very recently, however, some polyalkyl (meth)acrylates compatible with representatives of the polystyrene family have been discovered. Thus, polystyrene is compatible with polycyclohexyl (meth)acrylate up to the decomposition point ($>250°$ C.). (Cf. U.S. Pat. No. 4 898 912; the state of the art is also evaluated thoroughly there). Copolymers of methyl methacrylate and ethyl methacrylate on the one hand, and higher alkyl esters of methacrylic acid on the other hand are also compatible with polystyrenes (cf. DE-A 37 30 025 (U.S. Pat. No. 4 897 441)). We found particularly good compatibility with polystyrene when the polymer also contained small proportions of cyclohexyl methacrylate (DE-A 37 30 026 (U.S. Pat. No. 4 892 909)).

Poly-$\alpha$-methylstyrene also shows compatibility at room temperature with polymethyl methacrylate (PMMA), polyethyl methacrylate, and polybutyl methacrylate. Unlimited compatibility was found with polycyclohexyl (meth)acrylate (cf. U.S. Pat. No. 4 849 479). Poly(alkylstyrenes) (for example, those from the monomers p-methylstyrene, p-t-butylstyrene) very generally show compatibility with polyalkyl (meth)acrylates, when the condition is met that the side chains of the poly(alkylstyrenes) and the side chains of the polyalkyl (meth)acrylates show comparable Van-der-Waals volumes.

It is clear from the papers by Somani and Shaw, who studied the miscibility of poly(meth)acrylates with polystyrene using melt titration, that these types of polymers are incompatible for all practical purposes (miscibility only in the range of $10^{-5}$ to $10^{-6}$ parts by weight). The studies extended to blends of polystyrene with polymethyl acrylate, polyethyl acrylate, polybutyl acrylate, poly-n-butyl methacrylate, and polymethyl methacrylate (cf. R. H. Somani, M. T. Shaw, Macromolecules 14, 1549 (1981)). One skilled in the art could not expect exceptions from the typical incompatibility behavior of the homopolymers of this class of polymer according to the state of the art. Immiscible polymer blends are opaque as a rule unless the components have approximately the same index of refraction. Blends of polystyrene and PMMA therefore show pearly opalescence that is sometimes used for decorative purposes (cf. 0. Olabisi, L. M. Robeson & M. T. Shaw, Polymer-Polymer Miscibility, pg. 341, Academic Press 1979).

Both miscible and immiscible polymer systems have interesting aspects from the application point of view. Miscible polymer systems usually produce mechanical compatibility (cf. 0. Olabisi et al., loc. cit. pg. 351). The resultant transparency of the system is also advantageous in blends that are inherently transparent. According to the findings discussed above, the state of the art did not lead to the expectation that blends compatible with polystyrene could be obtained in the range of poly(meth)acrylic esters of lower alkanols.

SUMMARY OF THE INVENTION

It has now been found that contrary to all expectations, compatible systems of polystyrene on the one hand and a representative of polyalkyl methacrylic esters on the other can be formed under certain boundary conditions.

In particular, the present invention provides, in a first embodiment, a compatible polymer blend PM exhibiting a single glass transition temperature Tg, said polymer blend comprising:

(A) 0.1–99.9 wt. % of a polymer P1 comprising at least 95 wt. % styrene; and (B) 99.9–0.1 wt. % of a polymer P2 comprising
  (a) more than 90 wt. % and up to 100 wt. % of ethyl methacrylate, and
  (b) 0 wt. % up to less than 10 wt. % of at least one monomer copolymerizable with ethyl methacrylate, provided that (a) plus (b) add up to 100 wt. %.

In a second embodiment, the present invention provides a polymer composition comprising:

(I) 40–99 wt. % of a compatible polymer blend PM exhibiting a single glass transition temperature Tg, said polymer blend comprising:
  (A) 0.1–99.9 wt. % of a polymer P1 comprising at least 95 wt. % styrene; and
  (B) 99.9–0.1 wt. % of a polymer P2 comprising
    (a) more than 90 wt. % and up to 100 wt. % of ethyl methacrylate, and
    (b) 0 wt. % up to less than 10 wt. % of at least one monomer copolymerizable with ethyl methacrylate, provided that (a) plus (b) add up to 100 wt. %;

and (II) 60–1 wt. % of another polymer P3, chemically differentiable from said polymer P1 and said polymer P2, which is incompatible with said polymer P1, said polymer P2, and said polymer blend PM.

In a third embodiment, the present invention provides a coated article comprising: a shaped article made of a compatible polymer blend PM exhibiting a single glass transition temperature Tg, said polymer blend comprising (A) 0.1–99.9 wt % of a polymer P1 comprising at least 95 wt. % styrene, and (B) 99.9–0.1 wt. % of a polymer P2 comprising
  (a) more than 90 wt. % and up to 100 wt. % of ethyl methacrylate and
  (b) 0 wt. % up to less than 10 wt. % of at least one monomer copolymerizable with ethyl methacrylate, provided that (a) plus (b) add up to 100 wt. %;

and a coating formed on said shaped article, said coating comprising a polymer comprising
  (a') more than 90 wt. % and up to 100 wt. %, based on the weight of (a') and (b'), of ethyl methacrylate and (b') 0 wt. % up to less than 10 wt. %, based on the weight of (a') and (b'), of at least one monomer copolymerizable with ethyl methacrylate.

In a fourth embodiment, the present invention provides a coated article comprising:

a shaped article made of a polymer composition comprising (I) 40–99 wt. % of a compatible polymer blend PM exhibiting a single glass transition temperature Tg, said polymer blend comprising (A) 0.1–99.9 wt. % of a polymer P1 comprising at least 95 wt. % of styrene, and (B) 99.9–0.1 wt. % of a polymer P2 comprising (a) more than 90 wt. % and up to 100 wt. % of ethyl methacrylate, and (b) 0 wt. % up to less than 10 wt. % of at least one monomer copolymerizable with ethyl methacrylate, provided that (a) plus (b) add up to 100 wt. %, and (II) 60–1 wt. % of another polymer P3 chemically differentiable from said polymer P1 and said polymer P2, which is incompatible with said polymer P1, said polymer P2 and said polymer blend PM;

and a coating formed on said shaped article, said coating comprising a polymer comprising (a') more than 90 wt. % and up to 100 wt. %, based on the weight of (a') and (b'), of ethyl methacrylate and (b') 0 wt. % up to less than 10 wt. %, based on the weight of (a') and (b'), of at least one monomer copolymerizable with ethyl methacrylate.

In a fifth embodiment, the present invention provides an optical gradient fiber comprising:

a core formed of a polymer P1, said polymer P1 comprising at least 95 wt. % styrene;

a sheath, formed about said core, of a polymer P2, said polymer P2 comprising (a) more than 90 wt. % and up to 100 wt. % of ethyl methacrylate, and (b) 0 wt. % up to less than 10 wt. % of at least one monomer copolymerizable with ethyl methacrylate, provided that (a) plus (b) add up to 100 wt. %; and an intermediate layer, intermediate said core and said sheath and in direct contact with said core and said sheath, said intermediate layer formed of a compatible polymer blend PM exhibiting a single glass transition temperature Tg, said polymer blend comprising (A) 0.1–99.9 wt. % of said polymer P1, and (B) 99.9–0.1 wt. % of said polymer P2.

DETAILED DESCRIPTION OF THE INVENTION

This invention relates to compatible polymer blends PM of styrene polymers and methacrylic ester polymers, with the blend PM being formed from (A) 0.1 to 99.9, preferably 1 to 99, with particular preference 2 to 98, especially 5 to 95, very especially 20 to 80 wt. % of a styrene polymer that is made up of at least 95 wt. % styrene (=Polymer P1) and (B) 99.9 to 0.1, preferably 99 to 1, especially 95 to 5, very especially 80 to 20 wt. % of a (meth)acrylic ester polymer that consists of a) >90 and up to 100 wt. %, preferably at least 91 wt. % ethyl methacrylate and b) zero to <10 wt. %, preferably at least 1 and up to 9 wt. % of another monomer copolymerizable with ethyl methacrylate (=Polymer P2).

The monomers copolymerizable with ethyl methacrylate may include (meth)acrylic esters of cyclic alkanols, especially cyclohexanol and cyclopentanol, provided that a) and b) in component (B) add up to 100 wt. %. Of particular interest is a polymer blend PM consisting of predominant fractions (>50 wt. %) of styrene units, for example polystyrene. Preferably, the total of polymer components (A) plus (B) amounts to one hundred percent of all of the polymers in the blend PM, but under some circumstances the polymer blend PM may be used instead of a homogeneous polymer, i.e., being able to be processed in combination with other polymers.

In view of the findings of the state of the art, the compatibility of the blends that can be made pursuant to the invention from polystyrene pursuant to (A) and the polymethacrylate pursuant to (B) has to be considered surprising.

The polymer blends of polystyrene as polymer component (A) and polyethyl methacrylate as polymer component (B) (=Polymer Blend PM-1), i.e., blends of homopolymers, should be mentioned in particular. Such blends are compatible in practically all blend ratios at room temperature, contrary to the closely related homologs PMMA and polybutyl methacrylate, for which no compatibility with polystyrene was found.

Geometric considerations can be called on to understand the extraordinarily surprising behavior of the polyethyl methacrylate component compared to other polyalkyl methacrylates. Thus, when the ethyl carboxylate group of polyethyl methacrylate is viewed as a pseudo-ring, good geometric conformity with the phenyl groups of polystyrene is obtained with regard to the side chains.

The characterization of the polymer blends PM pursuant to the invention as compatible blends follows from recognized criteria (cf. Kirk-Othmer, loc. cit. Vol. 18, pp. 457–460) in particular:

a) When using optical procedures, a single index of refraction is observed in the polymer blends PM pursuant to the invention, which lies between those of the two polymer components (A) and (B); and b) The polymer blends PM have a single glass transition temperature Tg (that lies between those of the polymer components).

(To determine the glass transition temperature Tg, refer also to Encyclopedia of Polymer Science & Technology, 2nd Ed., Vol. 7, pg. 532–544, John Wiley & Sons 1987). Attention must be paid in the existing possible choices to the effect that the glass transition temperature Tg of the resultant polymer does not have a restrictive effect on the industrial usefulness of the entire PM system. Thus, to make shaped objects from the polymer blend PM, at least one of the polymers should have a glass transition temperature Tg >50° C.; it is also preferred for this application for the polymer blend PM to have a glass transition temperature Tg >50° C. This preference applies in particular to the production of injection molded, pressed, or extruded objects made from the polymer blend PM. For other fields of application, for example for paints, elastomers, or for reversible thermotropic glazing (polymer blend with turbidity point on heating, according to DE-A 34 36 477 (U.S. Pat. No. 4 772 500) for example), however, polymer blends PM that have a polymer component (B) with a glass transition temperature Tg <40° C. are also advantageous. It is of interest for all of these applications that the polymer blend pursuant to the invention usually has a very readily adjustable turbidity temperature in the range from room temperature up to about 250° C. (see Examples).

Preparation of Polymers (A) and (B)

Polymers (A) and (B) can be prepared according to the known rules of polymerization and by known procedures. The styrene polymers of (A), for example, can be prepared by the method of Houben Weyl, Methods of Organic Chemistry, 4th Edition, Vol. XIV/1, pp. 761–841, Georg Thieme-Verlag (1961). They are also available on the market in suitable form. Free radical procedures are preferred, but ionic polymerization procedures can also be used. The molecular weights $\overline{Mw}$ of the polymers (A) used pursuant to the invention are usually above 2000, preferably in the range of 5000 to 5,000,000, and with special preference in the range of 20,000 to 200,000 Daltons. (Determined by light scattering; cf. Ullmann's Encyclopedia of Industrial Chemistry, 4th Edition, Vol. 15, pp. 285–387, Verlag Chemie 1978).

The homopolymers and copolymers (B) may also be prepared by known procedures. (Cf. H. Rauch-Puntigam, Th. Völker, Acrylic and Methacrylic Compounds, Springer-Verlag 1967). Even though it is possible in principle to prepare them by anionic polymerization or group transfer polymerization (see also O. W. Webster et al., J. Am. Chem. Soc., 105, 5706 (1983)), nevertheless the preferred form of preparation is free radical polymerization.

The molecular weights $\overline{Mw}$ of the polymers (B) are above 2000 as a rule, generally in the range of 10,000 to 2,000,000, preferably 20,000 to 200,000 Daltons (light scattering).

It has proved to be desirable for at least one of the two polymer components (A) or (B) to have a molecular weight $\overline{Mw}$ below 100,000. Preferably, both components (A) and (B) have molecular weights below 100,000 and above 2000 Daltons. It is particularly preferred for the molecular weight range of at least one of the components to be from 2000 to 1,000,000 Daltons.

Preparation of Blends PM

The compatible blends PM can be prepared by various procedures; for example, they are produced by intensive mechanical blending of components (A) and (B) in the melt, in an extruder, etc.; or they can be prepared from a common solvent as so-called "solution cast polyblends". (Cf. Kirk-Othmer, Encyclopedia of Chemical Technology, 3rd Ed. Vol. 18, pg. 443–478, J. Wiley, 1982). The procedure can also be to dissolve Polymer (A) in the monomer mixture of the other Polymer (B) and then to produce it in the presence of Polymer (A). Conversely, Polymer (A) can also be produced in the presence of Polymer (B). In the same way, the polymer blend PM can be produced from common precipitants. There are no limits to the method of blending.

As a rule, blends of components (A) and (B) are first prepared, advantageously starting with solids, for example in the form of a bead polymer or a granulate, using slow mixing units such as drum mixers, squirrel-cage mixers, double-chamber plow blade mixers. The slow-running mixing units cause mechanical blending without eliminating the phase boundaries. (Cf. Ullmann's Encyclopedia of Industrial Chemistry, 4th Edition, Vol. 2, pg. 282–311, Verlag Chemie). Thermoplastic treatment then follows by homogeneous blending in the melt using heated mixing units at the temperatures suitable for this, for example 150° to about 300° C. in kneaders or preferably extruders, for example single- or multiple-screw extruders, or optionally in extruders with oscillating screw and shear pins (for example, in a BUSSCO kneader).

Granulates with uniform grains can be prepared by these methods (for example, hot cutoff, cube-shaped, round-grained). The grain size of the granulates is in the range of 2 to 5 mm. Another simple method for producing polymeric combinations PM is the blending of polymer dispersions containing polymer component (A) and polymer dispersions containing the polymer component (B). These dispersion blends can be coagulated together, spray-dried together, or squeezed out together on an extruder. On the other hand, the dispersion blends can also be dried together to form a film.

Beneficial Effects of the Blends PM

The compatible polymer blends PM pursuant to the invention show the following advantages in particular, which suggest possible corresponding industrial uses, with "polystyrene" and "polyethyl methacrylate" in each case being mentioned as representative of the possibilities existing for Polymers (A) and (B).

1. The polymer blends are compatible in contrast to blends of other poly(meth)acrylates and polystyrenes, i.e., the polymer blends pursuant to the invention in the unpigmented state are glass-clear in contrast to incompatible polystyrene/poly(meth)acrylate blends (they show no light scattering, i.e., the haze is usually <10%). However, mixtures that are compatible only at room temperature but show demixing when the temperature is raised also conform to the invention.

2. Blends of polystyrenes and polyethyl methacrylates show moderate water absorption.

3. The double refraction of polystyrene can be reduced by blending with polyethyl methacrylate. The two properties mentioned above qualify the polymer blends PM pursuant to the invention especially as data storage material, particularly for optically readable information carriers. [Cf. J. Hennig, Kunststoffe 75, pg. 425 (1985)].

4. The refractive index of polystyrene can also be reduced by blending with polyethyl methacrylate. For example, the refractive index of polystyrene can be modified by blending with polyethyl methacrylate so that the refractive index of the polystyrene/polyethyl methacrylate blend matches the refractive index of an incorporated rubber phase. In this way, transparent plastics with high impact strength can be obtained.

Of special interest also are polymer compositions that consist of about 40–99 wt. %, preferably 70–95 wt. % of the polymer blend PM and 60–1 wt. %, preferably 30–5 wt. %, of another polymer P3, chemically differentiable from P1 and P2, with the polymer P3 being incompatible with P1, P2, and with the blend PM.

As a rule, the composition of the polymer blend PM in this case is chosen so that the refractive index of the polymer P3 conforms to the refractive index of the blend PM, so that as a rule:

$$|\eta_D^{25}{}_{PM} - \eta_D^{25}{}_{P3}| < 0.01$$

wherein $\eta_D^{25}{}_{PM}$ is the refractive index (D line of sodium) of the polymer blend PM at 25° C., and $\eta_D^{25}{}_{P3}$ is the refractive index (D line of sodium) of the polymer P3 at 25° C.

The polymer P3 incompatible with PM will usually have a Tg<20° C. and will be covalently linked at least partly to at least one of the constituents of the polymer blend PM, either P1 or P2. Furthermore, the polymer P3 may be crosslinked.

It is very particularly preferred for the polymer P3 to be polybutadiene or polyisoprene.

Polymer compositions made up of 40-99 wt. % PM and 1-60 wt. % P3 are distinguished by better impact resistance than pure PM, particularly when P3 has a Tg<20° C.

In particular, polymer compositions of 40-99 wt. % PM and 60-1 wt. % P3 provide simple high-impact strength blending of Polymer P2. Thus, P2 that may be brittle can be blended into a high-impact strength, clear PM/P3 polymer composition by blending with commercial P1 formulated for high impact strength (for example, styrene-butadiene block copolymers).

5. It is possible to produce an optical gradient fiber by covering polystyrene with polyethyl methacrylate: the following data are then obtained:
Core: polystyrene Refractive index $n_D^{20}=1.59$
Sheath: polyethyl methacrylate $n_D^{20}=1.48$
Transition: intermediate layer of polystyrene/polyethyl methacrylate polymer blend, in contact with both core and sheath, preferably of increasing polystyrene content going from sheath to core.
Such fibers can be used, for example, as optical waveguides.

6. Items made of polystyrene with a thin jacket of polyethyl methacrylate, especially a polyethyl methacrylate with (copolymerized) UV absorbers, are accessible. Usable UV absorbers are described, for example, in Kirk-Othmer, 3rd Ed. Vol. 23, pp. 615-627, J. Wiley 1983, and in U.S. Pat. No. 4 576 170. Preferably, the copolymerizable UV absorber may be incorporated into polymer P2 in an amount of 0.1-20 wt. % based on the total monomer content. In contrast to uncoated polystyrene, such items are weather-resistant. The otherwise serious problem of reuse of heterogeneously coated plastic wastes is eliminated, since wastes can be reincorporated because of their good compatibility. The items made of polystyrene or of the polymer combination PM are usually manufactured by injection, compression, extrusion, rolling, or casting. The jacket of Polymer P2 is usually applied by painting or by coextrusion.

7. Panels made of polystyrene with a coating of polyethyl methacrylate can be manufactured. Panels with such a structure show about 2% better optical transparency than untreated polystyrene panels. Panels with a coating of polyethyl methacrylate usually show modified corrosion resistance. Of particular interest are multiframe panels such as those used for glazing greenhouses, for example, which have been manufactured from polystyrene or a polymer blend PM and have a coating of a polymer (=Polymer P2) that contains ethyl methacrylate. (DE-A 16 09 777). Polystyrenes can also be cemented with Polymer P2 or advantageously with monomer/initiator mixtures containing ethyl methacrylate. In this case, the high rate of polymerization of methacrylates can be combined with their good polymer compatibility.

8. Processing advantages result from the use of blends PM consisting of >90 wt. % polystyrene and <10 wt. % polymethyl methacrylate. In this case, the methacrylate polymer assumes the function of a processing aid.

9. Transparent shaped objects can be obtained from polystyrene/polyethyl methacrylate blends that have been surface modified by the action of energy, for example irradiation, so that the methacrylate polymer has been degraded but not the polystyrene. (Shaped objects with antireflective surfaces, resist).

EXAMPLES

Obviously, numerous modifications and variations of the present invention are possible in light of the above teachings. It is therefore to be understood that within the scope of the appended claims, the invention may be practiced otherwise than as specifically described herein.

The VICAT softening point is determined by the method of DIN 53460.

The reduced viscosity ($\eta_{spec/c}$) is determined with reference to DIN 1342, DIN 51562, and DIN 7745.

The optical transparency, if not otherwise noted, can be determined by the method of DIN 5036.

The haze is specified in percent (ASTM D 1003).

Polyethyl methacrylate (PEMA J=27 ml/g) is blended with polystyrene (PS prepared by free radical polymerization with t-dodecyl mercaptan as regulator, J=46 ml/g) in toluene as solvent.

Films are made from the blends, and are dried at room temperature. Glass-clear, compatible polymer films are obtained, which demix on heating.

Mixture ratio (wt. %)

| PEMA | PS | Turbidity temperature (°C.) |
| --- | --- | --- |
| 70 | 30 | 79 |
| 60 | 40 | 79 |
| 50 | 50 | 75 |
| 40 | 60 | 75 |
| 30 | 70 | 75 |
| 20 | 80 | 80 |
| 10 | 90 | 103 |

What is claimed as new and desired to be secured by Letters Patent of the United States is:

1. A polymer composition comprising:
   (I) 40-99 wt. % of a compatible polymer blend PM exhibiting a single glass transition temperature Tg, said polymer blend comprising:
      (A) 0.1-99.9 wt. % of a polymer P1 comprising at least 95 wt. % styrene; and
      (B) 99.9-0.1 wt. % of a polymer P2 comprising
         (a) more than 90 wt. % and up to 100 wt. % of ethyl methacrylate, and
         (b) 0 wt. % up to less than 10 wt. % of at least one monomer copolymerizable with ethyl methacrylate, provided that (a) plus (b) add up to 100 wt. %;
   and
   (II) 60-1 wt. % of another polymer P3, chemically differentiable from said polymer P1 and said polymer P2, which is incompatible with said polymer P1, said polymer P2, and said polymer blend PM;
   wherein each of said polymer P1 and said polymer P2 independently has a weight average molecular weight Mw in the range of 2,000 to 5,000,000 Daltons.

2. The polymer composition according to claim 1, wherein the refractive index of the polymer blend PM ($\eta_D^{25}{}_{PM}$) and the refractive index of the polymer P3 ($\eta_D^{25}{}_{P3}$) are selected such that $|\eta_D^{25}{}_{PM}-\eta_D^{25}{}_{P3}|<0.01$.

3. The polymer composition according to claim 1, wherein the glass transition temperature Tg of polymer P3 is <20° C.

4. The polymer composition according to claim 1, wherein the polymer P3 is at least partly covalently linked with polymer P1 and/or polymer P2.

5. The polymer composition according to claim 1, wherein the polymer P3 is a crosslinked polymer.

6. The polymer composition according to claim 1, wherein polymer P3 is polybutadiene or polyisoprene.

7. The polymer composition according to claim 1, comprising (I) 70–95 wt. % of said polymer blend PM; and (II) 30–5 wt. % of said polymer P3.

8. The polymer composition according to claim 1, wherein polymer P1 is a styrene-butadiene block copolymer.

9. The polymer composition according the claim 1, wherein at least one of said polymer P1 and said polymer P2 has a weight average molecular weight Mw in the range of 20,000–200,000 Daltons.

10. The polymer composition according to claim 1, wherein both said polymer P1 and said polymer P2 have weight average molecular weights Mw in the range of 20,000–200,000 Daltons.

* * * * *